US012598503B2

(12) United States Patent
Gürsu et al.

(10) Patent No.: US 12,598,503 B2
(45) Date of Patent: Apr. 7, 2026

(54) RADIO INTERFACE MEASUREMENTS

(71) Applicant: Nokia Technologies Oy, Espoo (FI)

(72) Inventors: Halit Murat Gürsu, Munich (DE);
Riikka Karoliina Dimnik, Espoo (FI);
Jani-Pekka Kainulainen, Cambridge
(GB); Ali Karimidehkordi, Munich
(DE); Lars Dalsgaard, Oulu (FI); **Tero
Henttonen**, Espoo (FI)

(73) Assignee: Nokia Technologies Oy, Espoo (FI)

( * ) Notice: Subject to any disclaimer, the term of this
patent is extended or adjusted under 35
U.S.C. 154(b) by 0 days.

(21) Appl. No.: 19/301,023

(22) Filed: Aug. 15, 2025

(65) Prior Publication Data

US 2025/0374108 A1 Dec. 4, 2025

Related U.S. Application Data

(63) Continuation of application No.
PCT/EP2024/051327, filed on Jan. 22, 2024.

(30) Foreign Application Priority Data

Feb. 24, 2023 (GB) .................................... 2302713

(51) Int. Cl.
*H04W 24/00* (2009.01)
*H04W 24/10* (2009.01)
(Continued)

(52) U.S. Cl.
CPC ........... *H04W 24/10* (2013.01); *H04W 76/15*
(2018.02); *H04W 76/20* (2018.02)

(58) Field of Classification Search
CPC ..... H04W 24/10; H04W 76/20; H04W 76/15;
H04W 370/329
See application file for complete search history.

(56) References Cited

U.S. PATENT DOCUMENTS 11,445,399 B2 9/2022 Yang et al.
12,120,623 B2 * 10/2024 Liberg .............. H04W 56/0045
(Continued)

FOREIGN PATENT DOCUMENTS

KR 20250133773 A * 9/2025 ........... H04W 72/23
WO 2021/027521 A1 2/2021

OTHER PUBLICATIONS

"WF on improvement on FR2 SCell/SCG setup/resume", 3GPP
TSG-RAN WG4 Meeting #105, R4-2220415, Agenda: 8.21.5, Apple,
Nov. 14-18, 2022, 2 pages.
"Enhancement of FR2 cell measurements in RRC non-connected
mode", 3GPP TSG-RAN WG4 Meeting # 105, R4-2218411, Agenda:
8.21.2, Qualcomm Incorporated, Nov. 14-18, 2022, pp. 1-2.
"Feasible solutions for FR2 SCell/SCG setup/resume delay enhance-
ments", 3GPP TSG-RAN WG4 Meeting #105, R4-2219442, Agenda:
8.21.2, Nokia, Nov. 14-18, 2022, 10 pages.
(Continued)

*Primary Examiner* — Khai M Nguyen
(74) *Attorney, Agent, or Firm* — Nokia Technologies Oy

(57) ABSTRACT

An apparatus, comprising: at least one processor; and at least
one memory storing instructions that when executed by the
at least one processor cause the apparatus at least to perform:
receiving, at a user equipment from a network node, a
measurement validity configuration specifying radio inter-
face measurement characteristics required to be met by the
user equipment to obtain valid measurements; and deter-
mining, at the user equipment, whether radio interface
measurements made by the user equipment meet the mea-
surement validity configuration and, if so, providing an
indication to the network node that valid measurements have
been obtained.

18 Claims, 3 Drawing Sheets

(51) Int. Cl.
　　H04W 76/15　　　(2018.01)
　　H04W 76/20　　　(2018.01)

(56)　　　　　　　References Cited

U.S. PATENT DOCUMENTS

| | | | |
|---|---|---|---|
| 12,192,804 B2 * | 1/2025 | Han | H04B 7/0617 |
| 2019/0014492 A1 * | 1/2019 | Kim | H04L 5/0053 |
| 2021/0006438 A1 * | 1/2021 | Harrebek | H04W 24/10 |
| 2021/0120447 A1 | 4/2021 | Zhou et al. | |
| 2022/0174593 A1 * | 6/2022 | Teyeb | H04W 24/08 |
| 2025/0183970 A1 * | 6/2025 | Ma | H04W 24/10 |

OTHER PUBLICATIONS

"Discussion on study of improvement on FR2 Scell/SCG setup/
Resume", 3GPP TSG RAN WG4 Meeting #105, R4-2219649,
Agenda: 8.21.2, Ericsson, Nov. 14-18, 2022, pp. 1-8.
Search Report received for corresponding United Kingdom Patent
Application No. 2302713.9, dated Sep. 1, 2023, 6 pages.
International Search Report and Written Opinion received for
corresponding Patent Cooperation Treaty Application No. PCT/
EP2024/051327, dated Apr. 25, 2024, 14 pages.
"Supporting early measurement reporting in NR", 3GPP TSG RAN
WG2 Meeting #105, R2-1900104, Agenda: 11.10.3, Qualcomm
Incorporated, Feb. 25-Mar. 1, 2019, pp. 1-6.
"Measurement procedure", 3GPP TS: 34.123-1, V14.3.0, Dec.
2017, pp. 4099-4631.

* cited by examiner

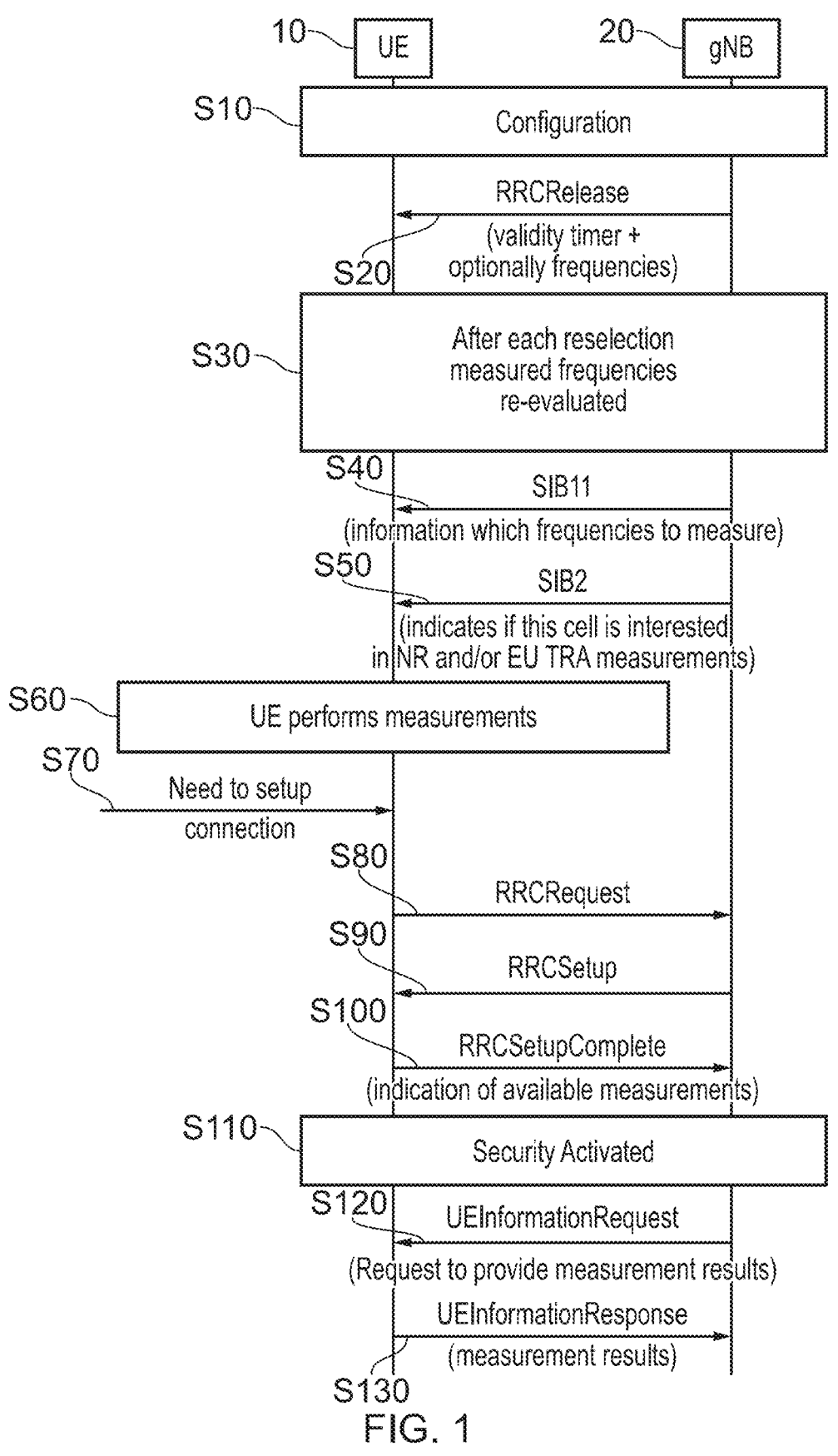

10  UE        20  gNB

S10  Configuration

RRCRelease (validity timer +
optionally frequencies)

S20

S30  After each reselection
measured frequencies
re-evaluated

S40  SIB11

(information which frequencies to measure)

S50  SIB2

(indicates if this cell is interested
in NR and/or EU TRA measurements)

S60  UE performs measurements

S70  Need to setup
connection

S80  RRCRequest

S90  RRCSetup

S100  RRCSetupComplete (indication of available measurements)

S110  Security Activated

S120  UEInformationRequest (Request to provide measurement results)

UEInformationResponse (measurement results)

RADIO INTERFACE MEASUREMENTS

TECHNOLOGICAL FIELD

Various example embodiments relate to telecommunications apparatus and methods.

BACKGROUND

In a wireless telecommunications network, user equipment are configured to perform radio interface measurements and can report those measurements to assist in performing a reconfiguration of the radio resources used to support communication between the user equipment and a network node such as a base station. Although this approach can be helpful, unexpected consequences can occur.

BRIEF SUMMARY

The scope of protection sought for various example embodiments of the invention is set out by the independent claims. The example embodiments and features, if any, described in this specification that do not fall under the scope of the independent claims are to be interpreted as examples useful for understanding various embodiments of the invention.

According to various, but not necessarily all, example embodiments of the invention there is provided an apparatus, comprising: at least one processor; and at least one memory storing instructions that when executed by the at least one processor cause the apparatus at least to perform: receiving, at a user equipment from a network node, a measurement validity configuration specifying radio interface measurement characteristics required to be met by the user equipment to obtain valid measurements; and determining, at the user equipment, whether radio interface measurements made by the user equipment meet the measurement validity configuration and, if so, providing an indication to the network node that valid measurements have been obtained.

The instructions may cause the apparatus at least to perform: adjusting a configuration of existing radio interface measurements made by the user equipment to meet the measurement validity configuration.

The instructions may cause the apparatus at least to perform: determining the apparatus has not changed location and/or orientation after the last valid measurement so a previous valid measurement can be used to meet the measurement validity configuration.

The instructions may cause the apparatus at least to perform: determining the location and orientation of the user equipment since the last valid measurements to re-use the last valid measurements to meet the measurement validity configuration.

The instructions may cause the apparatus at least to perform: through determining the location and orientation of the UE doing extra positioning measurements or using external sensors.

The last valid measurements as indicated above may be earlier or measurements that were conducted by the user equipment previously. The user equipment may record the position and orientation after determining the last valid measurements. The UE may re-evaluate the location and orientation at the time of indication to the network. The time of indication to the network can be related to a RRC Setup request, paging or a mobile originating service request.

The instructions may cause the apparatus at least to perform: performing additional radio interface measurements made by the user equipment to meet the measurement validity configuration.

The measurement validity configuration may specify radio interface characteristics required to be met by the user equipment.

The measurement validity configuration may specify radio interface characteristics of at least one candidate target cell required to be met by the user equipment.

The measurement validity configuration may specify radio interface characteristics of at least one candidate PScell and/or SCell required to be met by the user equipment.

The measurement validity configuration may specify radio interface characteristics of at least one candidate PScell and/or SCell for Carrier Aggregation and/or Dual Connectivity required to be met by the user equipment.

The measurement validity configuration may specify radio interface characteristics of at least one candidate PScell and/or SCell for Carrier Aggregation and/or Dual Connectivity in FR2 required to be met by the user equipment.

The measurement validity configuration may comprise: at least one specified cell required to be measured; at least one specified band required to be measured; at least one specified carrier required to be measured; at least one specified signal strength of the measurements; at least one required periodicity of the measurements; and/or at least one required SSB periodicity of the measurements.

The instructions may cause the apparatus at least to perform: receiving, at a user equipment from a network node, a plurality of measurement validity configurations, each specifying radio interface measurement characteristics required to be met by the user equipment to obtain valid measurements for that measurement validity configuration.

The measurement validity configurations may have an associated identifier.

The indication may indicate one or more measurement validity configurations for which valid measurements have been obtained.

The indication may indicate one or more identifiers of the one or more measurement validity configurations for which valid measurements have been obtained.

The indication may indicate a time elapsed since valid measurements have been obtained for one or more measurement validity configurations.

The indication may indicate the radio interface measurement obtained which meet the one or more measurement validity configurations.

The indication may indicate which cell, band and/or carrier meet the one or more measurement validity configurations.

The providing the indication may comprise signalling the indication in Radio Resource The providing the indication may comprise signalling the indication in Radio Resource Control Setup Complete messaging.

According to various, but not necessarily all, example embodiments of the invention there is provided an apparatus, comprising: means for receiving, at a user equipment from a network node, a measurement validity configuration specifying radio interface measurement characteristics required to be met by the user equipment to obtain valid measurements; and means for determining, at the user equipment, whether radio interface measurements made by the user equipment meet the measurement validity configuration and, if so, providing an indication to the network node that valid measurements have been obtained.

The means may perform the optional features set out in relation to the apparatus mentioned above.

According to various, but not necessarily all, example embodiments of the invention there is provided an apparatus, comprising: circuitry configured to receive, at a user equipment from a network node, a measurement validity configuration specifying radio interface measurement characteristics required to be met by the user equipment to obtain valid measurements; and circuitry configured to determine, at the user equipment, whether radio interface measurements made by the user equipment meet the measurement validity configuration and, if so, providing an indication to the network node that valid measurements have been obtained.

The circuitry may be configured perform the optional features set out in relation to the apparatus mentioned above.

According to various, but not necessarily all, example embodiments of the invention there is provided a method, comprising: receiving, at a user equipment from a network node, a measurement validity configuration specifying radio interface measurement characteristics required to be met by the user equipment to obtain valid measurements; and determining, at the user equipment, whether radio interface measurements made by the user equipment meet the measurement validity configuration and, if so, providing an indication to the network node that valid measurements have been obtained.

The method may comprise adjusting a configuration of existing radio interface measurements made by the user equipment to meet the measurement validity configuration.

The method may comprise determining the apparatus has not changed location and/or orientation after the last valid measurement so a previous valid measurement can be used to meet the measurement validity configuration.

The method may comprise determining the location and orientation of the user equipment since the last valid measurements to re-use the last valid measurements to meet the measurement validity configuration.

The method may comprise through determining the location and orientation of the user equipment doing extra positioning measurements or using external sensors.

The last valid measurements as indicated above may be measurements that are conducted by the user equipment some time ago. The user equipment may record the position and orientation after determining the last valid measurements. The user equipment may re-evaluate the location and orientation at the time of indication to the network. The time of indication to the network can be related to a RRC Setup request, paging or a mobile originating service request.

The method may comprise performing additional radio interface measurements made by the user equipment to meet the measurement validity configuration.

The measurement validity configuration may specify radio interface characteristics required to be met by the user equipment.

The measurement validity configuration may specify radio interface characteristics of at least one candidate target cell required to be met by the user equipment.

The measurement validity configuration may specify radio interface characteristics of at least one candidate PScell and/or SCell required to be met by the user equipment.

The measurement validity configuration may specify radio interface characteristics of at least one candidate PScell and/or SCell for Carrier Aggregation and/or Dual Connectivity required to be met by the user equipment.

The measurement validity configuration may specify radio interface characteristics of at least one candidate PScell and/or SCell for Carrier Aggregation and/or Dual Connectivity in FR2 required to be met by the user equipment.

The measurement validity configuration may comprise: at least one specified cell required to be measured; at least one specified band required to be measured; at least one specified carrier required to be measured; at least one specified signal strength of the measurements; at least one required periodicity of the measurements; and/or at least one required SSB periodicity of the measurements.

The method may comprise receiving, at a user equipment from a network node, a plurality of measurement validity configurations, each specifying radio interface measurement characteristics required to be met by the user equipment to obtain valid measurements for that measurement validity configuration.

The measurement validity configurations may have an associated identifier.

The indication may indicate one or more measurement validity configurations for which valid measurements have been obtained.

The indication may indicate one or more identifiers of the one or more measurement validity configurations for which valid measurements have been obtained.

The indication may indicate a time elapsed since valid measurements have been obtained for one or more measurement validity configurations.

The indication may indicate the radio interface measurement obtained which meet the one or more measurement validity configurations.

The indication may indicate which cell, band and/or carrier meet the one or more measurement validity configurations.

The providing the indication may comprise signalling the indication in Radio Resource The providing the indication may comprise signalling the indication in Radio Resource Control Setup Complete messaging.

According to various, but not necessarily all, example embodiments of the invention there is provided a non-transitory computer readable medium comprising program instructions stored thereon for performing at least the following: receiving, at a user equipment from a network node, a measurement validity configuration specifying radio interface measurement characteristics required to be met by the user equipment to obtain valid measurements; and determining, at the user equipment, whether radio interface measurements made by the user equipment meet the measurement validity configuration and, if so, providing an indication to the network node that valid measurements have been obtained.

The instructions may be for performing the optional features set out in relation to the method mentioned above.

According to various, but not necessarily all, example embodiments of the invention there is provided an apparatus, comprising: at least one processor; and at least one memory storing instructions that when executed by the at least one processor cause the apparatus at least to perform: receiving, at a network node, an indication of at least one candidate target cell; determining, at the network node, a measurement validity configuration specifying radio interface measurement characteristics required to be met by a user equipment to obtain valid measurements for the at least one candidate target cell; and transmitting, to the user equipment, the measurement validity configuration.

The measurement validity configuration may specify radio interface characteristics required to be met by the user equipment.

The measurement validity configuration may specify radio interface characteristics of the at least one candidate target cell required to be met by the user equipment.

The measurement validity configuration may specify radio interface characteristics of at least one candidate PScell and/or SCell required to be met by the user equipment.

The measurement validity configuration may specify radio interface characteristics of at least one candidate PScell and/or SCell for Carrier Aggregation and/or Dual Connectivity required to be met by the user equipment.

The measurement validity configuration may specify radio interface characteristics of at least one candidate PScell and/or SCell for Carrier Aggregation and/or Dual Connectivity in FR2 required to be met by the user equipment.

The measurement validity configuration may comprise: at least one specified cell required to be measured; at least one specified band required to be measured; at least one specified carrier required to be measured; at least one specified signal strength of the measurements; at least one required periodicity of the measurements; and/or at least one required SSB periodicity of the measurements.

The instructions may cause the apparatus at least to perform: receiving indications for a plurality of candidate target cells and transmitting a plurality of measurement validity configurations, each specifying radio interface measurement characteristics required to be met by the user equipment to obtain valid measurements for that measurement validity configuration.

The measurement validity configurations may have an associated identifier.

The instructions may cause the apparatus at least to perform: receiving, from the user equipment, an indication that valid measurements have been obtained.

The instructions may cause the apparatus at least to perform: in response to the indication that valid measurements have been obtained, transmitting a request for measurements.

The indication may indicate one or more measurement validity configurations for which valid measurements have been obtained.

The indication may indicate one or more identifiers of the one or more measurement validity configurations for which valid measurements have been obtained.

The indication may indicate a time elapsed since valid measurements have been obtained for one or more measurement validity configurations.

The indication may indicate the radio interface measurement obtained which meet the one or more measurement validity configurations.

The indication may indicate which cell, band and/or carrier meet the one or more measurement validity configurations.

The instructions may cause the apparatus at least to perform: identifying a candidate target cell from the indication.

The indication may be received in Radio Resource Control messaging.

The indication may be received in Radio Resource Control Setup Complete messaging.

According to various, but not necessarily all, example embodiments of the invention there is provided an apparatus, comprising: means for receiving, at a network node, an indication of at least one candidate target cell; means for determining, at the network node, a measurement validity configuration specifying radio interface measurement characteristics required to be met by a user equipment to obtain valid measurements for the at least one candidate target cell; and means for transmitting, to the user equipment, the measurement validity configuration.

The means may perform the optional features set out in relation to the apparatus mentioned above.

According to various, but not necessarily all, example embodiments of the invention there is provided an apparatus, comprising: circuitry configured to receive, at a network node, an indication of at least one candidate target cell; circuitry configured to determine, at the network node, a measurement validity configuration specifying radio interface measurement characteristics required to be met by a user equipment to obtain valid measurements for the at least one candidate target cell; and circuitry configured to transmit, to the user equipment, the measurement validity configuration.

The circuitry may be configured perform the optional features set out in relation to the apparatus mentioned above.

According to various, but not necessarily all, example embodiments of the invention there is provided a method, comprising: receiving, at a network node, an indication of at least one candidate target cell; determining, at the network node, a measurement validity configuration specifying radio interface measurement characteristics required to be met by a user equipment to obtain valid measurements for the at least one candidate target cell; and transmitting, to the user equipment, the measurement validity configuration.

The measurement validity configuration may specify radio interface characteristics required to be met by the user equipment.

The measurement validity configuration may specify radio interface characteristics of the at least one candidate target cell required to be met by the user equipment.

The measurement validity configuration may specify radio interface characteristics of at least one candidate PScell and/or SCell required to be met by the user equipment.

The measurement validity configuration may specify radio interface characteristics of at least one candidate PScell and/or SCell for Carrier Aggregation and/or Dual Connectivity required to be met by the user equipment.

The measurement validity configuration may specify radio interface characteristics of at least one candidate PScell and/or SCell for Carrier Aggregation and/or Dual Connectivity in FR2 required to be met by the user equipment.

The measurement validity configuration may comprise: at least one specified cell required to be measured; at least one specified band required to be measured; at least one specified carrier required to be measured; at least one specified signal strength of the measurements; at least one required periodicity of the measurements; and/or at least one required SSB periodicity of the measurements.

The method may comprise receiving indications for a plurality of candidate target cells and transmitting a plurality of measurement validity configurations, each specifying radio interface measurement characteristics required to be met by the user equipment to obtain valid measurements for that measurement validity configuration.

The measurement validity configurations may have an associated identifier.

The method may comprise receiving, from the user equipment, an indication that valid measurements have been obtained.

The method may comprise, in response to the indication that valid measurements have been obtained, transmitting a request for measurements.

The indication may indicate one or more measurement validity configurations for which valid measurements have been obtained.

The indication may indicate one or more identifiers of the one or more measurement validity configurations for which valid measurements have been obtained.

The indication may indicate a time elapsed since valid measurements have been obtained for one or more measurement validity configurations.

The indication may indicate the radio interface measurement obtained which meet the one or more measurement validity configurations.

The indication may indicate which cell, band and/or carrier meet the one or more measurement validity configurations.

The method may comprise identifying a candidate target cell from the indication.

The indication may be received in Radio Resource Control messaging.

The indication may be received in Radio Resource Control Setup Complete messaging.

According to various, but not necessarily all, example embodiments of the invention there is provided a non-transitory computer readable medium comprising program instructions stored thereon for performing at least the following: receiving, at a network node, an indication of at least one candidate target cell; determining, at the network node, a measurement validity configuration specifying radio interface measurement characteristics required to be met by a user equipment to obtain valid measurements for the at least one candidate target cell; and transmitting, to the user equipment, the measurement validity configuration.

The instructions may be for performing the optional features set out in relation to the method mentioned above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 1 illustrates the main steps of existing Early Measurement Reporting (EMR) behaviour for RRC idle mode;

DETAILED DESCRIPTION

Figure 2:
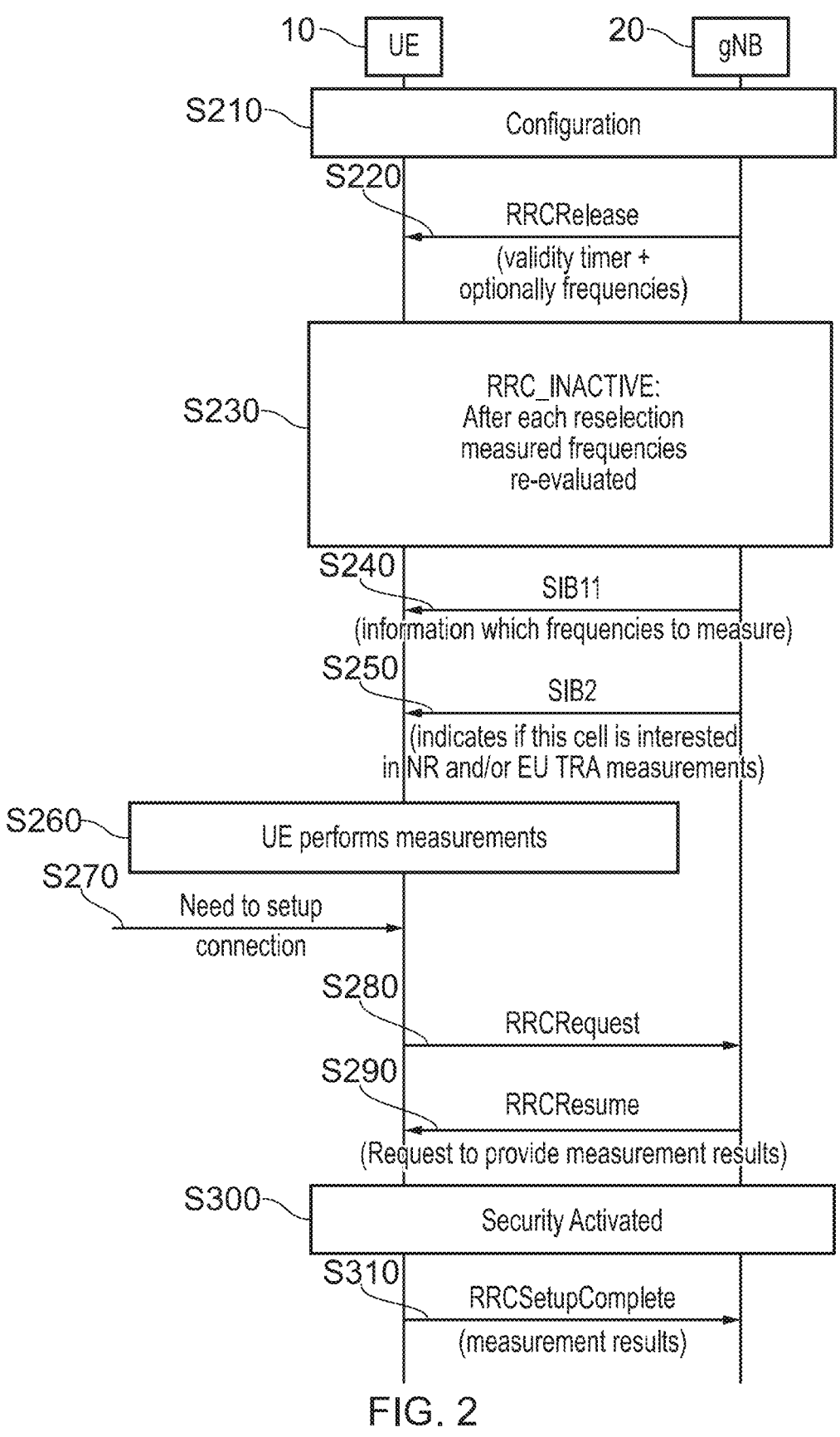
FIG. 2 illustrates the main steps of existing EMR behaviour for RRC active mod.

Before discussing the example embodiments in any more detail, first an overview will be provided. Some example embodiments provide a technique which enhances measurement reporting. A network node such as, for example, a user equipment (UE) is typically configured to perform measurements which are reported to another network node such as, for example, a serving base station to assist in cell selection. However, in some circumstances such as, for example, when the UE is in Radio Resource Control (RRC) Idle mode or Inactive mode, the UE's measurement regime may not be rigorous enough and/or may not report the measurements it has because a measurement timer has expired and/or a longer than desired period may elapse before suitable measurements can be made and reported to the network. Accordingly, some example embodiments provide one or more measurement validity configurations to the UE. Those measurement validity configurations, if satisfied, can provide an indication to the network that a cell is suitable for selection. For example, a measurement validity configuration may relate to a particular cell. The measurement validity configuration may specify that cell and, optionally, other characteristics that should be achieved for a valid measurement. Should the UE have measurements that meet that measurement validity configuration, then this can be indicated to the network. The UE may record its location and/or orientation when the measurements meet the measurement validity configuration and indicate this to the network. The network then knows that, because the measurements met the measurement validity configuration, the cell is suitable for selection earlier, without necessarily needing the measurements themselves to be provided to the network. In some example embodiments, the existing measurement configuration is sufficient to provide suitable measurements which can be assessed against the measurement validity configuration. However, where that is not the case, then the UE can change its measurement configuration and/or add additional measurements in order to provide suitable measurements which can be assessed against the measurement validity configuration.

In third generation partnership project (3GPP) release 16, an EMR (Early Measurement Reporting) feature has been introduced to ensure faster setup or reconfiguration of the carrier aggregation (CA)/dual connectivity (DC). The early measurement feature enables the UE to perform frequency measurement for availability of SCells when the UE is in a radio resource control (RRC) idle state or an RRC inactive state. While performing a transition to an RRC connected state from one of the RRC idle state or an RRC inactive state, the UE transmits the generated early measurement report to a base station associated with a primary cell (PCell) to reduce delay in setting up DC or CA. During early measurements, the UE is equipped with a validity timer (T331) and given the option to measure specific frequencies. The camped cell sends the UE SIB2 and SIB11, which provide information about whether the cell is interested in EUTRA and/or NR measurements, and which cells and carrier frequencies the UE should measure. While in idle or inactive state, the UE performs the measurements. If the RRC setup request is triggered while the validity timer is still running, the UE reports its measurements' availability in the RRCSetupComplete message and provides them to the network based on the request. If the UE is in the inactive state, it sends the measurements to the network in the RRCResumeComplete message. However, it's important to note that the measurements become invalid after the validity timer expires, and the network can no longer use them.

Early Measurement Reporting (EMR)—Radio Resource Control (RRC) Idle Mode

FIG. 1 illustrates the main steps of existing EMR behaviour for RRC idle mode.

At steps S10, S20, S30 at the time of RRC Release, the UE 10 is configured with a measurement timer (T331) and optional frequencies to measure that forms the EMR setting.

At step S40, the UE receives optionally SIB 11 from the camped cell to determine which cells and which carrier frequency to measure for early measurements.

At step S50, the UE receives optionally SIB 2 from the camped cell to determine if the camped cell is interested in New Radio (NR) and/or Evolved Universal Mobile Telecommunications System (UMTS) Terrestrial Radio Access (EUTRA) measurements.

At step S60, the UE performs measurements according to the EMR settings.

At step S70, any UE procedure triggers an RRC setup request at step S80 and the network responds with an RRCSetup message at step S90. If this procedure is triggered with respect to the validity timer indicated in step S20, then UE follows the following procedure, else it doesn't report any already obtained measurements during the connection setup procedure.

At step S100, the RRCSetupComplete message indicates (from UE to network): the availability of the measurements; UE information request-requests measurements; UE information response provides the measurements to the network.

At step S110 security keys are exchanged, a UEInformationRequest message requesting that the measurement results are provided occurs at step S120 and a UEInformationResponse message containing the measurement results occurs at step S130.

Early Measurement Reporting (EMR)—Radio Resource Control (RRC) Inactive Mode

FIG. 2 illustrates the main steps of existing EMR behaviour for RRC active mode.

At steps S210, S220, S230 at the time of RRC Release, the UE 10 is configured with a measurement timer (T331) and optional frequencies to measure that forms the EMR setting.

At step S240, the UE optionally receives SIB 11 from the camped cell to determine which cells and which carrier frequency to measure for early measurements.

At step S250, the UE optionally receives SIB 2 from the camped cell to determine if the camped cell is interested in New Radio (NR) and/or Evolved Universal Mobile Telecommunications System (UMTS) Terrestrial Radio Access (EUTRA) measurements.

At step S260, the UE performs measurements according to the EMR settings.

At step S270, any UE procedure triggers an RRC setup request at step S280 and the network responds with an RRCResume message at step S290. If this procedure is triggered with respect to the validity timer indicated in step S220, then UE follows the following procedure, else it doesn't report any already obtained measurements during the connection setup procedure. The RRCResume message indicates (from network to UE): requests measurements; with RRCResumeComplete, the UE provides the measurements to the network.

At step S300 security keys are exchanged.

At step S310, the RRCResume message indicates the measurements to the network

However, the UE indicating the available measurements during the validity timer proposes a limited use-case for measurement and for this reason it cannot be used or considered by the network after validity timer is expired. In order to prepare and establish a Primary Secondary cell group cell (PScell)/Secondary Cell (Scell) in dual connectivity (DC) carrier aggregation (CA) (DCCA), the network needs to wait for the EMR measurement which are available after complete connection establishment (and exchanging security keys) that includes several message exchange between the UE and network plus processing time which may delay DCCA setup. This is particularly important for applications with high throughput and low-latency requirement (such as Extended Reality (XR), Augmented Reality (AR)), or applications that needs DCCA to enhance the reliability such as ultra-reliable low-latency communications (URLLC). The UE might be doing measurements without the network configuration. However, once the UE reports the measurements the network doesn't know what the settings are for these measurements and as such it cannot determine whether a PSCell or SCell is good enough to be added right away. In particular, when the UE performs measurement without network configuration, the network cannot immediately determine whether to add a PScell or Scell once the UE reports the measurements. This is because the network lacks information about the measurement settings, making it difficult to assess whether a PScell or Scell is suitable for addition to the network at that time.

Accordingly, some example embodiments seek to provide a solution to speedup connectivity such as, for example, DCCA setup.

Some example embodiments provide a technique for obtaining valid measurements for faster dual connectivity or carrier aggregation (DCCA) setup. Some example embodiments are suited to use in Frequency Range 2 (FR2).

This is achieved by configuring the UE with a validity configuration comprising a list of cell/carrier/bands to measure with cell/carrier/bands specific information such as SSB periodicity or the measurement periodicity the UE should consider to obtain valid measurements for the DCCA setup.

The UE uses the information in the validity configuration and evaluates existing idle or connected mode measurements. If certain conditions are met, then the UE conducts extra measurements to determine if valid measurements are there to be used for DCCA setup.

The user equipment conducts measurements according to the validity configurations and sends an indication to the network in a suitable message. One such message is the RRC connection setup complete message. The indication may indicate available measurements, valid measurements, the age of the measurements and all indications can be cell/carrier/bands specific as configured with the validity configuration. The network uses this indication to determine the correct SCell or PSCell for the UE to initiate the SCell and PSCell addition procedure.

Figure 3:
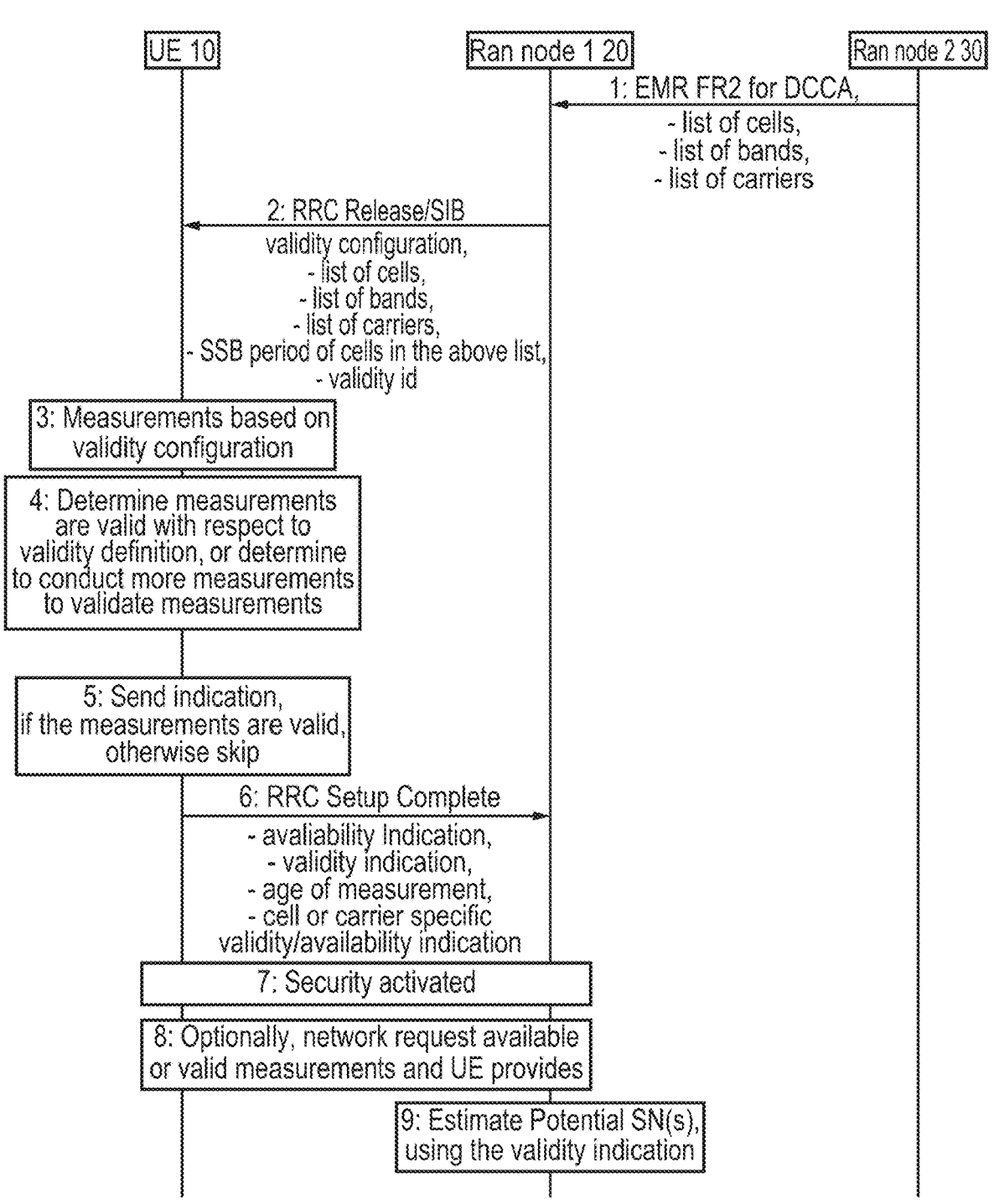
FIG. 3 illustrates a message sequence chart for Rel. 18 EMR behaviour for RRC Idle mode according to one example embodiment.

FIG. 3 illustrates a message sequence chart for Rel. 18 EMR behaviour for RRC Idle mode according to one example embodiment.

At step 1, RAN node 2 30 provides RAN node 1 20 with EMR settings. In this example embodiment, the EMR settings relate to FR2 for DCCA, but it will be appreciated that this could also relate to other use cases. The EMR settings identify a list of cells, a list of bands and/or a list of carriers deemed suitable for DCCA.

At step 2, RAN node 1 20 determines one or more measurement validity configurations based on the EMR settings. The validity configurations identify the list of cells, list of bands, list of carriers, measurement periodicity, SSB period of the cells, signal strength and/or other characteristics that need to be met to obtain a valid measurement.

Typically, each validity configuration is associated with a validity identifier. The validity configurations are then conveyed to the UE 10 and the UE 10 consider is configured with a definition of valid measurement.

In one approach, the UE 10 is configured with the measurement period or other characteristics as required by the 3GPP specification. The UE 10 10 knows that it should acquire L1 measurements each measurement_period to forward these to higher layers or it should form a L3 measurement sample within each measurement period.

In another approach, the UE 10 is configured with the measurement_period or other characteristics via dedicated signalling. Here UE-specific parameters, such as UE radio frequency (RF) chain knowledge either known or estimated by the network can be used to configure the UE 10 with a measurement_period. The measurement_period can be set shorter if it is known that the UE 10 can activate multiple RF chains to get measurements faster if need be or if additional reference signals (RSs) are sent by candidate cells to speed up the measurement (measurement validation).

In another approach, the UE 10 is configured with the measurement_period via broadcast signalling. Here cell-specific parameters, such as PSCells and SCells that have overlapping coverage with the camped cell information can be used to fine-tune the measurement_period value. For instance, the UE 10 can be indicated with frequency bands to measure and the SSB_periodicity of the measurement period can be indicated to the UE 10 to have different measurement periods. With a higher SSB_periodicity, the measurement_period can be set lower. The measurement-_period can be indicated to the UE 10 for each frequency band that UE 10 can measure over the camped cells.

At step 3, the UE 10 reviews its existing measurements

At step 4, the UE 10 evaluates the validity conditions to determine if the current measurements or available measurements are valid and determines whether it needs to adjust those measurements or perform more measurements to obtain valid measurements. The determining validation can happen once UE receives the validity configuration, or when it determines the need to indicate validity to the network. The need to indicate validity to the network can be related to a connection setup request, paging or service request. Optionally, the UE may record its location and/or orientation when valid measurements are obtained. The location and/or orientation can be established using extra positioning measurements and/or using internal and/or external sensors. The UE may determine whether it has changed its location and/or orientation since a previous valid measurement and, if not, use that previous valid measurement as meeting the validity configuration.

At step 5, if measurements have been obtained which meet the validity conditions then these are signalled at step 6 to RAN node 1 20. The signalling can happen right after the validation, or it can happen at a later stage. Typically, the messaging provides one or more of: an availability indicator which indicates that measurements are available, but do not meet the validity conditions; a validity indicator which indicates that measurements are available which meet the validity conditions; an age indicator which indicates how much time has elapsed since the UE 10 has produced the measurement; cell/band/carrier-specific indicators which indicate the cell/band/carrier for which measurements are available. The UE 10 may also provide an indication of the location and/or orientation of the UE when the measurements were taken which met the validity conditions. These indicators may be provided with the associated validity identifier.

In particular, before the UE 10 is about to initiate the RRC connection setup the UE 10 determines whether:

The measurements for a PSCell and/or SCell are valid based on the validity configuration. Should the UE 10 determine that the measurement of the PSCell and/or SCell are valid, then the UE 10 sends the validity indication or valid measurements for those cells.

The measurements for a PSCell and/or SCell are valid based on the validity configuration. Should the UE 10 determine that the measurement of the PSCell and/or SCell are valid, the UE 10 indicates with a flag that the measurement for these cells are valid.

The measurement for a PSCell and/or SCell are indicated with the age of the measurements (how much time has passed since the UE 10 has produced the L1 measurement or obtained the last L1 sample).

The validity or availability (i.e. availability indicates that relevant measurements have been made but these do not meet the validity configuration) are indicated with the granularity of a PSCell and/or SCell and/or with a carrier frequency indication. This indication may come with a list of best beams measured by the UE 10 for the target cell, as such the target node (RAN node 2 30) can use this information to prepare a random access configuration. Following step 7, at step 8, the network can use this information to request the measurement of a specific PSCell or SCell or a carrier frequency. Or the network can skip the measurement reporting and go ahead with setting up the SCell or PSCell using this information at step 6 without requesting the measurements.

Should the measurements be requested, then at step 9, the network uses this information to determine which PSCell or SCell can be added for the UE 10 once the UE 10 goes to the connected mode.

For example, the existing initial measurement configuration specifies which cell, which frequency (carrier), which periodicity the UE 10 should conduct measurements. Once the UE 10 receives the measurement configuration, the UE 10 has to follow this measurement configuration and report with respect to this measurement configuration One existing measurement configuration example might be: measure cell x, with a period of 100 ms. This sets a minimum requirement for the UE 10 but the UE 10 is able to measure more.

One validity configuration may be: measure cell x, with a period of 50 ms, RSRP greater than z1, validity identifier 1. In response to the validity configuration, the UE 10 changes the measurements or makes additional measurements to measure cell x with a period of 50 ms. The UE 10 may then respond to the network indicating that it measured cell x with a period of 50 ms and here are the valid measurements. In particular, the UE 10 may signal (typically with validity identifier 1) an availability indicator which indicates that measurements are available, but do not meet the validity conditions; a validity indicator which indicates that measurements are available which meet the validity conditions; an age indicator which indicates how much time has elapsed since the UE 10 has produced the measurement; cell/band/carrier-specific indicators which indicate the cell/band/carrier for which measurements are available.

Another validity configuration may be: measure cell y, with a period of 75 ms, RSRP greater than z2, validity identifier 2. In response to the validity configuration, if the UE wasn't already measuring cell y, the UE 10 changes the measurements or makes additional measurements to measure cell y with a period of 50 ms. The UE 10 may then respond to the network indicating that it measured cell y with a period of 75 ms and here are the valid measurements. In particular, the UE 10 may signal (typically with validity identifier 2) an availability indicator which indicates that measurements are available, but do not meet the validity conditions; a validity indicator which indicates that measurements are available which meet the validity conditions; an age indicator which indicates how much time has elapsed since the UE 10 has produced the measurement; cell/band/carrier-specific indicators which indicate the cell/band/carrier for which measurements are available.

Another validity configuration may be: If cell x has been measured (in the last 3 seconds) (with RSRP greater than x) (measurement configuration 1) 100 ms, then conduct new measurements to determine if cell x is still greater than RSRP value Y (measurement config 2) with a 20 ms periodicity, validity identifier 3 The UE 10 measures cell x once more and sees that it is greater than RSRP value Y. The UE 10 may then respond to the network indicating that it measured cell x with a period of 20 ms and here are the valid measurements. In particular, the UE 10 may signal (typically with validity identifier 3) an availability indicator which indicates that measurements are available, but do not meet the validity conditions; a validity indicator which indicates that measurements are available which meet the validity conditions; an age indicator which indicates how much time has elapsed since the UE 10 has produced the measurement; cell/band/carrier-specific indicators which indicate the cell/band/carrier for which measurements are available. Hence, it can be seen that the UE 10 combines existing measurements (measurement configuration 1), with new measurements (measurement configuration 2)—to fulfil the validity configuration.

In summary, the validity configuration checks and/or controls whether UE has conducted measurements on a specific cell, on a specific carrier frequency with a specific periodicity. In one example embodiment, once UE receives the validity configuration, the UE would compare the measurements it conducted versus the validity configuration. In another example embodiment, once UE receives the validity configuration, the UE would do add on measurements to fulfil the validity requirement. If the measurement fulfils the validity configuration, then UE will report the existence of valid measurements.

Hence, it can be seen that in some example embodiments, the UE is configured with a validity configuration that includes a list of cell/carrier/bands to measure, along with specific information related to each cell/carrier/band, such as SSB periodicity or measurement periodicity the UE should consider to obtain valid measurements for the DCCA setup. The UE conducts extra measurements apart from existing idle, or connected mode measurements to determine if valid measurements are there to be used for DC/CA setup. Based on the validity configurations, the UE performs measurements and communicates the results to the network through the RRC connection setup complete message. These results can indicate available measurements, valid measurements, the age of the measurements, and can be specific to the cell/carrier/bands configured in the validity configuration. The network then utilizes this information to identify the appropriate SCell or PSCell for the UE to initiate the SCell and PSCell addition procedure. Existing approaches do not specifically address the validation measurement configurations that comprise a list of cell/carrier/bands to measure along with cell/carrier/band-specific information. Some example embodiments introduce additional indication options in the RRC setup complete message, beyond the validity indication, such as the availability indication, age of measurement, and cell/carrier-specific validity/availability indication. Another distinction is that the UE not only verifies the validity of existing measurements, but also conducts additional measurements for validation.

One example embodiment comprises: receiving validity configuration, list of cells/bands/carriers, SSB periods of the cells and validity id from the gNB either in RRC release message or broadcasted through SIB; conducting measurements based on the validity configuration; determining whether the measurements are valid with respect to validity definition or determining to conduct more measurements for validation; and sending different indications for valid measurements such as availability indication, validity indication, age of measurement, cell/carrier specific availability and validity indication to gNB in RRC setup complete message.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The term non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although example embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A user equipment, comprising:
at least one processor; and
at least one memory storing instructions that when executed by the at least one processor cause the user equipment at least to perform:
receiving, at the user equipment from a network node, a measurement validity configuration specifying radio interface measurement characteristics required to be met by the user equipment to obtain valid measurements; and
determining, at the user equipment, whether radio interface measurements made by the user equipment meet the measurement validity configuration and, if so, providing an indication to the network node that valid measurements have been obtained, without providing to the network measurement results of the radio interface measurements.

2. The user equipment of claim 1, wherein the instructions cause the user equipment at least to perform:
adjusting a configuration of existing radio interface measurements made by the user equipment to meet the measurement validity configuration;
performing additional radio interface measurements made by the user equipment to meet the measurement validity configuration; and/or
determining the user equipment has not changed location and/or orientation after the last valid measurement so a previous valid measurement can be used to meet the measurement validity configuration.

3. The user equipment of claim 1, wherein the measurement validity configuration specifies:
radio interface characteristics required to be met by the user equipment;
radio interface characteristics of at least one candidate target cell required to be met by the user equipment;
radio interface characteristics of at least one candidate PScell and/or SCell required to be met by the user equipment;
radio interface characteristics of at least one candidate PScell and/or SCell for Carrier Aggregation and/or Dual Connectivity required to be met by the user equipment; and/or
radio interface characteristics of at least one candidate PScell and/or SCell for Carrier Aggregation and/or Dual Connectivity in FR2 required to be met by the user equipment.

4. The user equipment of claim 1, wherein the measurement validity configuration comprises:
at least one specified cell required to be measured;
at least one specified band required to be measured;
at least one specified carrier required to be measured;
at least one specified signal strength of the measurements;

at least one required periodicity of the measurements; and/or
at least one required SSB periodicity of the measurements.

5. The user equipment of claim 1, wherein the instructions cause the user equipment at least to perform:
receiving, at the user equipment from a network node, a plurality of measurement validity configurations, each specifying radio interface measurement characteristics required to be met by the user equipment to obtain valid measurements for that measurement validity configuration.

6. The user equipment of claim 5, wherein the measurement validity configurations have an associated identifier.

7. The user equipment of claim 1, wherein the indication indicates:
one or more measurement validity configurations for which valid measurements have been obtained;
one or more identifiers of the one or more measurement validity configurations for which valid measurements have been obtained;
a time elapsed since valid measurements have been obtained for one or more measurement validity configurations;
a radio interface measurement obtained which meet the one or more measurement validity configurations; and/or
which cell, band and/or carrier meet the one or more measurement validity configurations.

8. The user equipment of claim 1, wherein the providing the indication comprises:
signalling the indication in Radio Resource Control messaging; and/or
signalling the indication in Radio Resource Control Setup Complete messaging.

9. A method, comprising:
receiving, at a user equipment from a network node, a measurement validity configuration specifying radio interface measurement characteristics required to be met by the user equipment to obtain valid measurements; and
determining, at the user equipment, whether radio interface measurements made by the user equipment meet the measurement validity configuration and, if so, providing an indication to the network node that valid measurements have been obtained, without providing to the network measurement results of the radio interface measurements.

10. A network node, comprising:
at least one processor; and
at least one memory storing instructions that when executed by the at least one processor cause the network node at least to perform:
receiving, at the network node, an indication of at least one candidate target cell;
determining, at the network node, a measurement validity configuration specifying radio interface measurement characteristics required to be met by a user equipment to obtain valid measurements for the at least one candidate target cell;
transmitting, to the user equipment, the measurement validity configuration;
receiving, from the user equipment, an indication that valid measurements have been obtained, without receiving measurement results of the radio interface measurements; and indicating, to the user equipment, that the at least one candidate target cell is suitable for selection.

11. The network node of claim 10, wherein the measurement validity configuration specifies:

radio interface characteristics required to be met by the user equipment;

radio interface characteristics of the at least one candidate target cell required to be met by the user equipment;

radio interface characteristics of at least one candidate PScell and/or SCell required to be met by the user equipment;

radio interface characteristics of at least one candidate PScell and/or SCell for Carrier Aggregation and/or Dual Connectivity required to be met by the user equipment; and/or radio interface characteristics of at least one candidate PScell and/or SCell for Carrier Aggregation and/or Dual Connectivity in FR2 required to be met by the user equipment.

12. The network node of claim 10, wherein the measurement validity configuration comprises:

at least one specified cell required to be measured;

at least one specified band required to be measured;

at least one specified carrier required to be measured;

at least one specified signal strength of the measurements;

at least one required periodicity of the measurements; and/or at least one required SSB periodicity of the measurements.

13. The network node of claim 10, wherein the instructions cause the network node at least to perform:

receiving indications for a plurality of candidate target cells and transmitting a plurality of measurement validity configurations, each specifying radio interface measurement characteristics required to be met by the user equipment to obtain valid measurements for that measurement validity configuration.

14. The network node of claim 13, wherein the measurement validity configurations have an associated identifier.

15. The network node of claim 10, comprising receiving, from the user equipment, an indication that valid measurements have been obtained.

16. The network node of claim 10, wherein the indication indicates:

one or more measurement validity configurations for which valid measurements have been obtained;

one or more identifiers of the one or more measurement validity configurations for which valid measurements have been obtained;

a time elapsed since valid measurements have been obtained for one or more measurement validity configurations;

a radio interface measurement obtained which meet the one or more measurement validity configurations; and which cell, band and/or carrier meet the one or more measurement validity configurations.

17. The network node of claim 10, wherein the instructions cause the network node at least to perform:

identifying a candidate target cell from the indication.

18. The network node of claim 10, wherein the indication is received:

in Radio Resource Control messaging; and/or in Radio Resource Control Setup Complete messaging.

\* \* \* \* \*